(12) United States Patent
Ahn

(10) Patent No.: US 7,191,863 B2
(45) Date of Patent: Mar. 20, 2007

(54) APPARATUS FOR PREVENTING ERRONEOUS OPERATION OF ELECTRO-MOTION PEDAL DEVICE IN AUTOMOBILE AND METHODS OF USE THEREOF

(75) Inventor: Kil-Jae Ahn, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 483 days.

(21) Appl. No.: 10/749,240

(22) Filed: Dec. 30, 2003

(65) Prior Publication Data

US 2005/0040710 A1 Feb. 24, 2005

(30) Foreign Application Priority Data

Aug. 19, 2003 (KR) .................. 10-2003-0057218

(51) Int. Cl.
*B60K 26/02* (2006.01)
*B60K 20/04* (2006.01)
*B60L 1/00* (2006.01)
*B60L 3/04* (2006.01)

(52) U.S. Cl. .................. 180/326; 180/277; 180/279; 307/10.1

(58) Field of Classification Search ................ 180/277, 180/279, 326
See application file for complete search history.

(56) References Cited

U.S. PATENT DOCUMENTS 5,044,478 A * 9/1991 Kaesgen et al. ......... 192/220.1
6,520,045 B2 * 2/2003 Fukase et al. ................ 74/512

FOREIGN PATENT DOCUMENTS

JP 2003-056371 2/2003

* cited by examiner

*Primary Examiner*—Brian Sircus
*Assistant Examiner*—Hal I. Kaplan
(74) *Attorney, Agent, or Firm*—Morgan Lewis & Bockius LLP

(57) ABSTRACT

An apparatus for preventing an erroneous operation of an electro-motion pedal device in an automobile and methods of use thereof, wherein an engine starting condition, positions of a shift lever and a parking brake activated condition are detected. When a safe condition of a non-moving automobile is detected, power is transmitted to an electro-motion pedal device to allow the pedal to be electronically adjusted, such that an erroneous operation of an electro-motion pedal device that might occur during an automobile in operation can be prevented to thereby avoid an accident in advance.

7 Claims, 4 Drawing Sheets

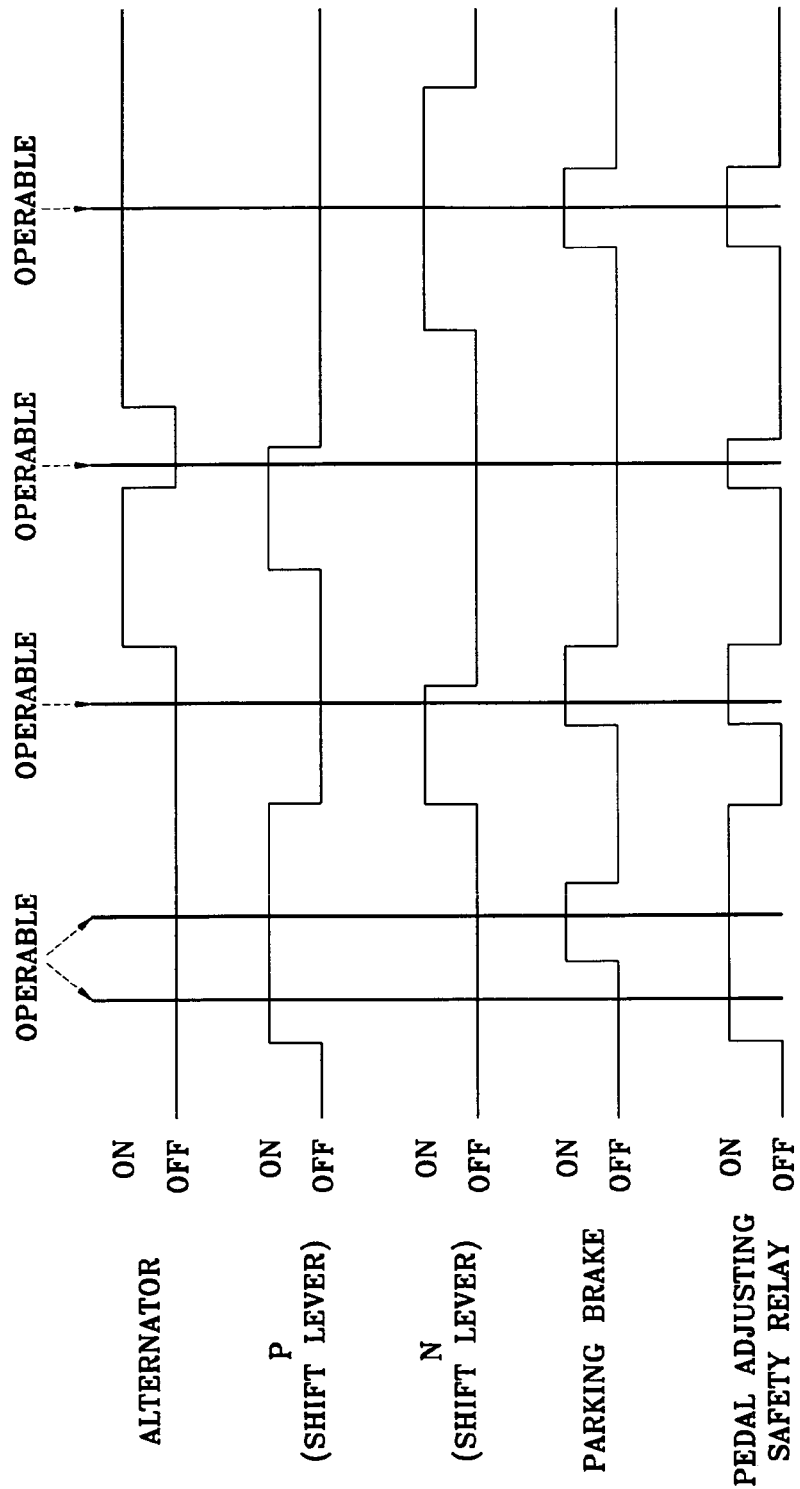

APPARATUS FOR PREVENTING ERRONEOUS OPERATION OF ELECTRO-MOTION PEDAL DEVICE IN AUTOMOBILE AND METHODS OF USE THEREOF

CROSS-REFERENCE TO RELATED APPLICATIONS

This application claims priority of Korean Application No. 10-2003-0057218, filed on Aug. 19, 2003, the disclosure of which is incorporated herein by reference.

FIELD OF THE INVENTION

The present invention provides an apparatus for preventing erroneous operation of an electro-motion pedal device in an automobile and methods of use thereof and, more particularly, to an apparatus for preventing erroneous operation of an electro-motion pedal device in an automobile and methods of using thereof, adapted to prevent an electro-motion pedal device from being electronically adjusted by a driver's erroneous operation whether intentional or unintentional while the automobile is in operation.

BACKGROUND OF THE INVENTION

Generally, an automobile of a manual transmission is equipped with an acceleration pedal for accelerating a vehicle speed, a brake pedal for manipulating a brake and a clutch pedal for manipulating a clutch. However, these pedals are established in consideration of a driver's average height such that it is difficult to manipulate these pedals in relation to the height of a driver, height of a seat, and distance from a dash board, and due to the inappropriate positions of these pedals, there is a high possibility of a driver being injured in an accident in case the distance between a driver and a steering wheel is too close. In order to alleviate these inconveniences and safety hazards, electro-motion pedal devices have been recently developed for directly adjusting the positions of these pedals in accordance with a driver's height, weight and seating position via his or her own manipulation.

There is a drawback in the conventional electro-motion pedal devices thus described in that the pedals are electronically adjusted regardless of the driver's own intention by an erroneous manipulation of the driver while an automobile is in operation, thereby causing a high possibility of an accident.

SUMMARY OF THE INVENTION

The present invention provides an apparatus for preventing an erroneous operation of electro-motion pedal devices in an automobile and methods of use thereof adapted to prevent pedals from being electronically adjusted by an erroneous operation of a driver while an automobile is moving.

In accordance with a preferred embodiment of the present invention, the apparatus for preventing an erroneous operation of electro-motion pedal devices in automobiles configured for varying positions of pedals by operating an electric-actuator in response to a switching manipulation of a driver, comprises a shifting stage detecting unit for detecting shifting stages of a transmission and a parking brake detecting unit for detecting a locked state of a parking brake. A controller establishes an input parameter from the shifting stage detected by the shifting stage detecting unit and the locked state of the parking brake detected by the parking brake detecting unit, and inputs the input parameter into a pre-set map table, and outputs a control signal for allowing or not allowing an electronic adjusting of pedal positions in response to a result therefrom. A switching unit is switched by the control signal output from the controller to block or apply an operation power input from the electric-actuator.

In another embodiment, the present invention provides a method for preventing an erroneous operation of electro-motion pedal devices in automobiles configured for varying positions of pedals by operating an electric-actuator in response to a switching manipulation of a driver to thereby prevent an erroneous operation of an electro-motion pedal devices in automobiles, comprises the steps of: detecting shifting stages; detecting a locked state of a parking brake; and applying an operating power to the electric actuator if the parking brake is in a locked state and a shifting stage is in a neutral stage or parking stage, and blocking the operating power if the parking brake is not in a locked state or a shifting stage is not a neutral or a parking stage.

In another embodiment, the present invention provides a method for preventing an erroneous operation of electro-motion pedal devices in automobiles configured for varying positions of pedals by operating an electric-actuator in response to a switching manipulation of a driver to thereby prevent an erroneous operation of an electro-motion pedal devices in automobiles, comprises the steps of: detecting shifting stages; detecting a locked state of a parking brake; and applying an operating power to the electric-actuator if a shifting stage is a parking stage or if a parking brake is in a locked state, and blocking the operating power to the electric-actuator if a shifting stage is not a parking stage and if a parking brake is not in a locked state.

BRIEF DESCRIPTION OF THE DRAWINGS

For a better understanding of the present invention, reference should be made to the following detailed description with the accompanying drawings, in which:

FIG. 4 is a time chart for exemplifying an operable condition of a pedal adjusting safety relay according to a calculating process of the controller of FIG. 2.

DETAILED DESCRIPTION OF THE PREFERRED EMBODIMENT

The preferred embodiment of the present invention will now be described in detail with reference to the accompanying drawings, where the present embodiment is not limiting the scope of the present invention but is given only as an illustrative purpose.

Figure 1:
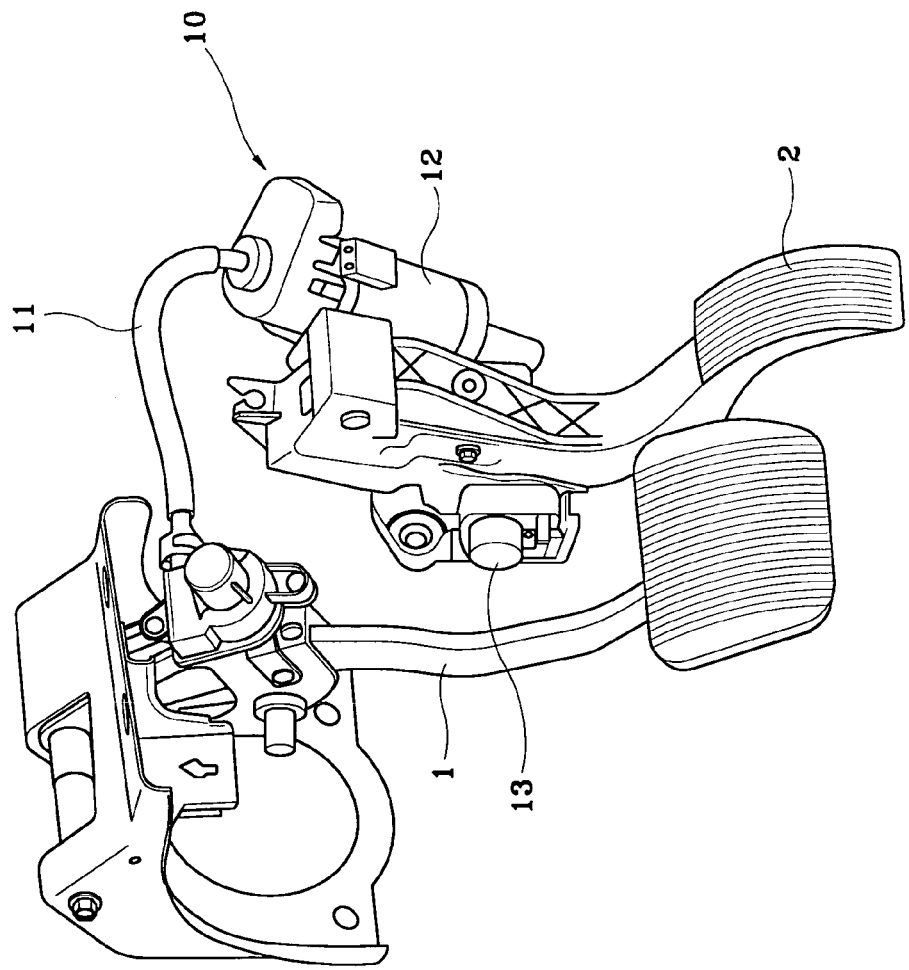
FIG. 1 is a perspective view for illustrating a pedal assembly of an automobile for an automatic transmission applied with an apparatus for preventing erroneous operation of electro-motion pedal devices in automobiles according to an embodiment of the present invention.
Figure 2:
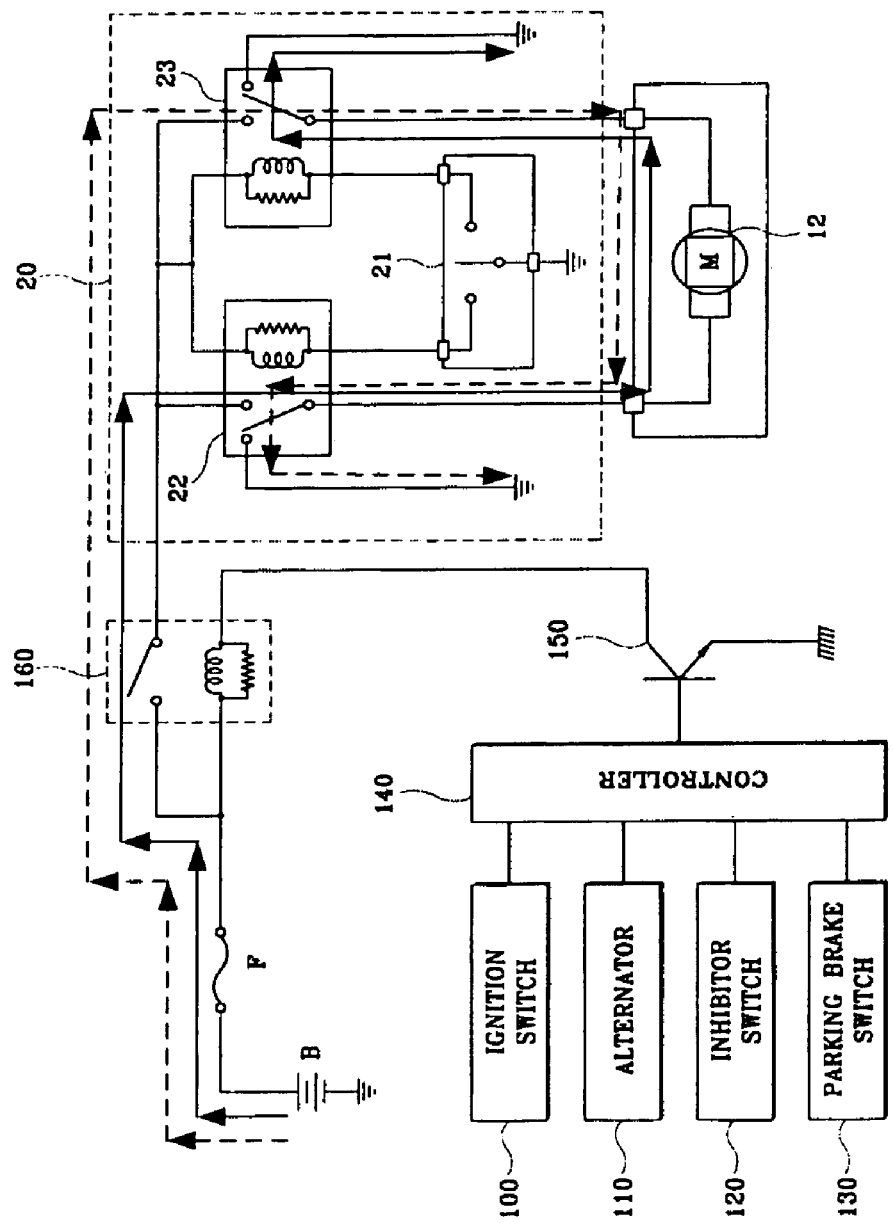
FIG. 2 is a schematic block diagram for illustrating an apparatus for preventing erroneous operation of electro-motion pedal devices in automobiles according to an embodiment of the present invention.
Figure 3:
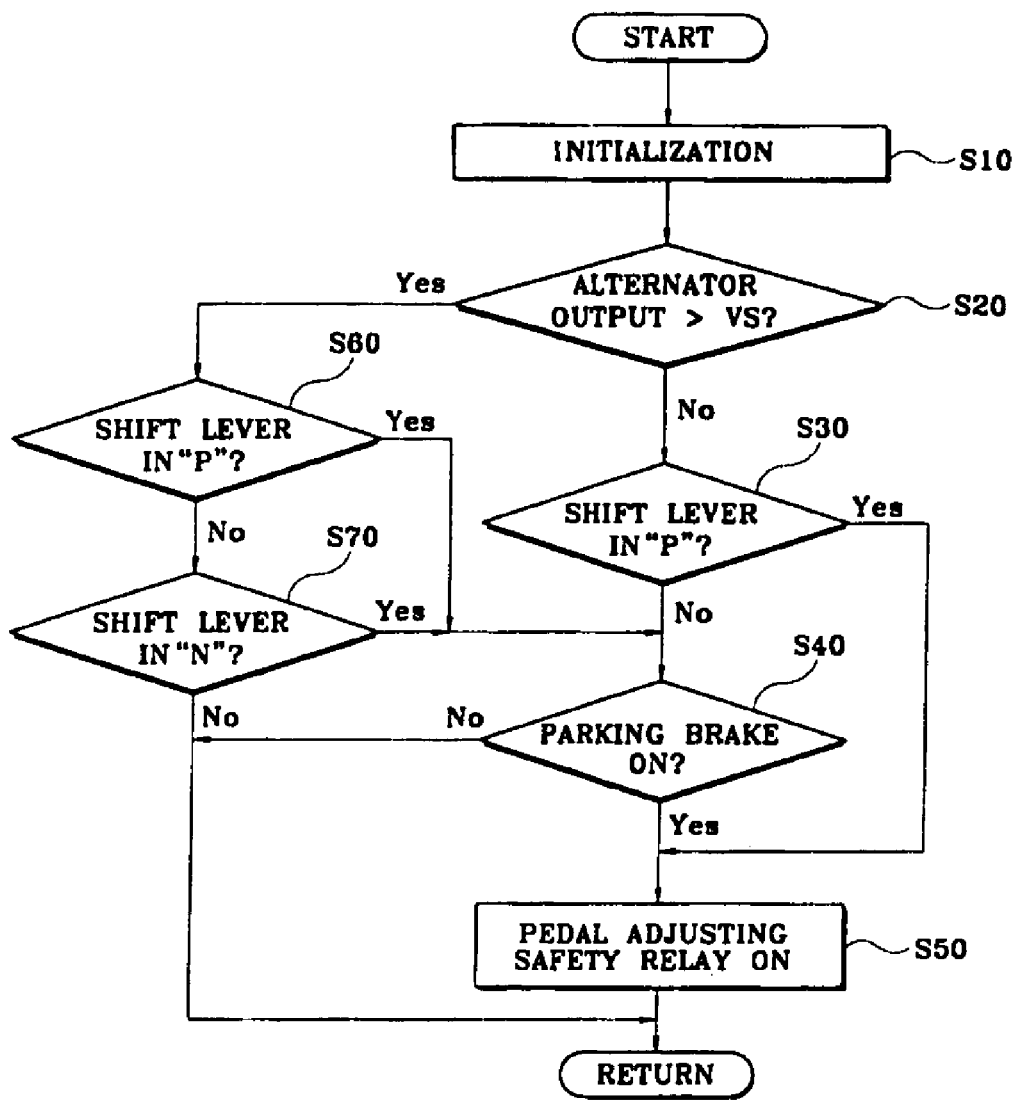
FIG. 3 is a flow chart for explaining a calculating process of a controller of FIG. 2.

As shown in FIGS. 1 and 2, an acceleration pedal 2 positioned at the left of a brake pedal 1 being applied with an electro-motion pedal device 10 is provided as an example. The electro-motion pedal device 10 serves to rotate a motor 12 in a forward and backward direction in response to a current applied from an electric cable 11 to rotate a hinge 13 and to vary the position of the acceleration pedal 2.

An apparatus for preventing erroneous operation of electro-motion pedal devices in automobiles according to an embodiment of the present invention includes a battery (B), a fuse (F), the motor 12, a circuit for driving an electro-motion pedal device 20, an ignition switch 100, an alternator 110, an inhibit switch 120, a parking brake switch 130, a controller 140, a switching control transistor 150 and a pedal adjusting safety relay 160.

The circuit for driving the electro-motion pedal device 20 includes a manipulating switch 21 manipulated by a driver, and first and second driving relays 22 and 23 for being turned on and off by the manipulation of the manipulating switch 21 to switch a direction of a current applied from the battery (B) via the fuse (F) and to apply same to the motor 21. In other words, when a driver switches the manipulating switch 21 to the left, the first relay 22 is turned on by the current from the battery (B), while the second relay 23 is turned off, such that the current from the battery (B) is inputted to the motor 12 along a direction indicated by a solid arrow line to rotate the motor 12 in the forward direction, and the pedal 2 is rotated to one direction about the hinge 13 to thereafter be varied in positions thereof.

Furthermore, when a driver switches the manipulating switch 21 to the right, the second relay 23 is turned on while the first relay 22 is turned off, such that the current of the battery (B) is applied to the motor 21 along a direction indicated by a dotted arrow line to rotate the motor 21 in the reverse direction, and the pedal 2 is rotated in the other direction about the hinge 13 to thereafter be varied in positions thereof.

Meanwhile, the ignition switch 100 is a switch for selecting a stand-by state where a driver applies battery power to each device of an automobile in response to a driver's key manipulation, and a starting state where the battery power is applied to a starting motor to start an engine. A key signal is inputted to the controller 140 in response to the key manipulation of the driver. The alternator 110 is a device for transforming a rotational force of a started engine to power and outputting same, and the controller 140 detects an output voltage of the alternator 110.

The inhibitor switch 120 functions to detect a position of a shift lever to send a detected signal corresponding thereto to the controller 140, and the parking brake switch 130 detects a locked state of a parking brake lever to send a signal corresponding thereto to the controller 140.

The controller 140 detects the output voltage outputted from the alternator 110 when the key signal is inputted from the ignition switch 100 and simultaneously detects a position of a shift lever in response to a signal inputted from the inhibitor switch 120, and also discriminates whether or not a parking brake lever is locked according to a signal applied from the parking brake switch 130. Furthermore, the controller 140 establishes as an input parameter the detected output voltage of the alternator 110, a position of a shift lever and a locked state of the parking brake lever, and inputs the input parameter into a pre-set map table, and outputs a control signal for allowing or not allowing an electronic adjusting of pedal positions in response to a result therefrom.

The switching control transistor 150 controls a switching operation of the pedal adjusting safety relay 160 by being turned on and off in response to the control signal from the controller 140, and the pedal adjusting safety relay 160 applies or blocks the power of the battery (B) to the circuit for driving an electro-motion pedal device 20 by being switched in response to the switching control transistor 150.

Next, the operation of the present invention thus constructed will be described with reference to the accompanying drawings, where S denotes a step. When a key signal is inputted from the ignition switch 100, the controller 140 is initialized, and the switching control transistor 150 and the pedal adjusting safety relay 160 are turned off under the initialized condition of the controller 140 such that the power from the battery (B) is not applied to the circuit for driving the electro-motion pedal device 20 (S10). As a result, even if a driver manipulates the manipulating switch 21, the motor 12 is not activated and the position of the pedal is not varied.

The initialized controller 140 detects an output voltage outputted from the alternator 110, and simultaneously detects a position of the shift lever in response to the detected signal applied from the inhibitor switch 120 and also discriminates whether or not the parking brake lever is locked in response to the detected signal inputted from the parking brake switch 130.

First, the controller 140 discriminates whether the output voltage of the alternator 110 is above an established voltage (Vs) (S20). As a result of the discrimination at S20, if it is discriminated that the output voltage of the alternator 110 is below the established voltage (Vs), which is a state of an engine not being started, the controller 140 outputs a control signal to turn on the switching control transistor 150 when the shift lever is in the parking stage (P) (30), or when the parking brake is activated (S40), in other words, if one of the two conditions is met, where the two conditions include a condition of the shift lever being in the parking stage (P) and a condition of the parking brake being locked.

When the switching control transistor 150 is turned on, the pedal adjusting safety relay 160 is also turned on (S50), and the power of the battery (B) is applied to the circuit for driving the electro-motion pedal device 20 such that when a driver manipulates the manipulating switch 21, the motor 12 is activated to change the position of the pedal. As a result of the discrimination at S20, if the output voltage of the alternator 110 is larger than the established voltage (Vs), which is a state of an engine being started, the controller 140 outputs a control signal to turn on the switching control transistor 150 if the shift lever is in the parking stage (P) or in the neutral stage (N) (S60) (S70), and the parking brake is activated, in other words, if one of the two conditions is met, where the two conditions include a condition of the shift lever being in the parking stage (P) or in the neutral position (N), and a condition of the parking brake being activated. When the switching control transistor 150 is turned on to turn on the pedal adjusting safety relay 160 (S50), the power of the battery (B) is applied to the circuit for driving the electro-motion pedal device 20 such that when a driver manipulates the manipulating switch 21, the motor 12 is activated to change the position of the pedal.

In other words, in the present invention, a discrimination is made as to whether an engine has started by the output voltage of the alternator 110, and if the engine has not started, which makes the occupants less vulnerable to an accident, a variable position of the pedal is allowed if one of the two conditions is satisfied, where the two conditions include a condition of the shift lever being in the parking stage (P) and a condition of the parking brake being activated.

Meanwhile, when an engine has started, which makes the occupants more vulnerable to an accident, a position variation of the pedal is allowed if one of the two conditions is met, where the two conditions include a condition of the shift lever being in the parking stage (P) and a condition of the shift lever being in the neutral stage (N), and the parking brake is activated, in other words, if the shift lever is not in driving mode and the parking brake is activated.

Next, the probable conditions thus described of the pedal position being variable in response to each input parameter will be explained with reference to FIG. 4.

If the output of the alternator 110 is not above the established voltage (Vs) (OFF), in the case of the shift lever being in the parking stage (P) or the parking brake being activated, the pedal adjusting safety relay 160 is turned on to allow the pedal to become variable in positions thereof.

As evidenced in FIG. 4, even if the shift lever is in the parking stage (P), and if the output of the alternator 110 surpasses the established voltage (Vs), the pedal adjusting safety relay 160 is turned off to make it impossible for the pedal to be variable.

If the voltage of the alternator 110 is above the established voltage (Vs) (ON), the pedal adjusting safety relay 160 is turned on to make it possible for the pedal to be variable in positions thereof, only if the parking brake is locked on, and the shift lever is in the parking stage (P), or in the neutral stage (N).

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto, and their equivalents.

In the present invention mentioned in the afore-said description, an engine starting condition, positions of the shift lever and a parking brake activated condition are detected, and only when a safe condition of an automobile not running is detected, power is transmitted to the electro-motion pedal device to allow the pedal to be electronically adjusted. As apparent from the foregoing, there is an advantage in the apparatus for preventing erroneous operation of electro-motion pedal device in an automobile and a method thereof thus described according to the embodiment of the present invention in that an erroneous operation of an electro-motion pedal device that might occur during an automobile in operation can be prevented to thereby avoid an accident in advance.

What is claimed is:

1. An apparatus for preventing erroneous operation of an electro-motion pedal device in an automobile configured for varying positions of pedals by operating an electric-actuator in response to a switching manipulation of a driver, the apparatus comprising:
   a shifting stage detecting unit for detecting shifting stages of a transmission;
   a parking brake detecting unit for detecting a locked or unlocked state of a parking brake;
   a controller for outputting a control signal for allowing or not allowing an electronic adjusting of pedal positions based on the shifting stages and the locked or unlocked state of the parking brake; and
   a switching unit for being switched by the control signal outputted from said controller to block or apply an operation power inputted from said electric-actuator.

2. The apparatus of claim 1 further comprising an engine start detecting unit for detecting an engine running condition, wherein said control signal is further based on the engine running condition.

3. The apparatus of claim 2, wherein said engine start detecting unit is an alternator for changing a rotational force of the engine to power, and said controller detects an output voltage of said alternator to discriminate whether an engine has started or not.

4. A method for preventing an erroneous operation of electro-motion pedal devices in automobiles configured for varying positions of pedals by operating an electric-actuator in response to a switching manipulation of a driver to thereby prevent an erroneous operation of an electro-motion pedal device in an automobile, wherein the method comprises the steps of:
   detecting shifting stages;
   detecting a locked state of a parking brake; and applying an operating power to said electric actuator if said parking brake is in a locked state and a shifting stage is a neutral stage or a parking stage, and blocking the operating power if said parking brake is not in a locked state or a shifting stage is not a neutral or a parking stage (power control step).

5. The method of claim 4 further comprising a step of detecting an engine start, wherein the power control step is carried out only when the engine has started.

6. A method for preventing an erroneous operation of electro-motion pedal devices in automobiles configured for varying positions of pedals by operating an electric-actuator in response to a switching manipulation of a driver to thereby prevent an erroneous operation of an electro-motion pedal device in an automobile, wherein the method comprises the steps of:
   detecting shifting stages;
   detecting a locked state of a parking brake; and
   applying an operating power to said electric-actuator if a shifting stage is a parking stage or if a parking brake is in a locked state, and blocking the operating power to said electric-actuator if a shifting stage is not a parking stage and if a parking brake is not in a locked state (power control step).

7. The method of claim 6 further comprising a step of detecting an engine start, wherein the power control step is carried out only when the engine has not started.

* * * * *